United States Patent [19]
Leiber

[11] 3,802,528
[45] Apr. 9, 1974

[54] AUTOMATIC TORQUE CONTROL
[75] Inventor: Heinz Leiber, Leimen, Germany
[73] Assignee: Teldix GmbH, Heidelberg, Germany
[22] Filed: Aug. 1, 1972
[21] Appl. No.: 277,031

[30] Foreign Application Priority Data
Aug. 5, 1971   Germany............................ 2139230

[52] U.S. Cl. ............................ 180/82 R, 180/77 R
[51] Int. Cl. .......................................... B60k 27/08
[58] Field of Search......... 180/82 R, 103, 105, 77 R

[56] References Cited
UNITED STATES PATENTS
3,560,759   2/1971   Buehler............................... 290/17
3,622,973   11/1971   Domann........................... 340/52 R Primary Examiner—Richard A. Schacher
Attorney, Agent, or Firm—Spencer & Kaye

[57] ABSTRACT

An arrangement for the automatic control of the torque of an engine of a vehicle when an undesirable slip occurs in the driven wheels of the vehicle due to excessive engine braking torque comprises a device for detecting wheel slip in at least one driven wheel resulting from the excessive braking torque and an adjusting element controlled by the detecting device to increase the fuel supply to the engine when this slip occurs.

10 Claims, 5 Drawing Figures

3,802,528

AUTOMATIC TORQUE CONTROL

BACKGROUND OF THE INVENTION

The invention relates to an arrangement for automatic control of the torque of an engine of a vehicle when an undesirable slip occurs in the driven wheels, by controlling the engine fuel supply.

Such an arrangement is known, for example, from German Patent No: 695,718. There, in order to prevent wheel spin of the vehicle wheels, as a result of an engine torque which is excessive in view of the existing road conditions, the difference between the rotational speeds of the driven and of the non-driven wheels is measured, and, in the case of an inadmissible increase of the speed of the driven wheel, the supply of fuel is automatically restricted, e.g., by adjusting the throttle frame. The previous state is only restored, when the driven and non-driven wheels again have the same rotational speeds.

SUMMARY OF THE INVENTION

It is the object of the invention to prevent an excessive wheel slip of the driven wheels of a vehicle in consequence of an excessive engine braking torque.

According to the invention, there is provided an arrangement for the automatic control of the torque of an engine of a vehicle having a plurality of driven wheels when an undesirable slip occurs in said driven wheels due to excessive braking torque of the engine, comprising a device for detecting a wheel slip in at least one said driven wheel resulting from said excessive braking torque, and an adjusting element controlled by said detecting device to increase the fuel supply to the engine on the occurrence of said slip.

BRIEF DESCRIPTION OF THE DRAWINGS

The invention will now be described in greater detail, by way of example, with reference to the drawings, in which.

DESCRIPTION OF THE PREFERRED EMBODIMENTS

Figure 1:
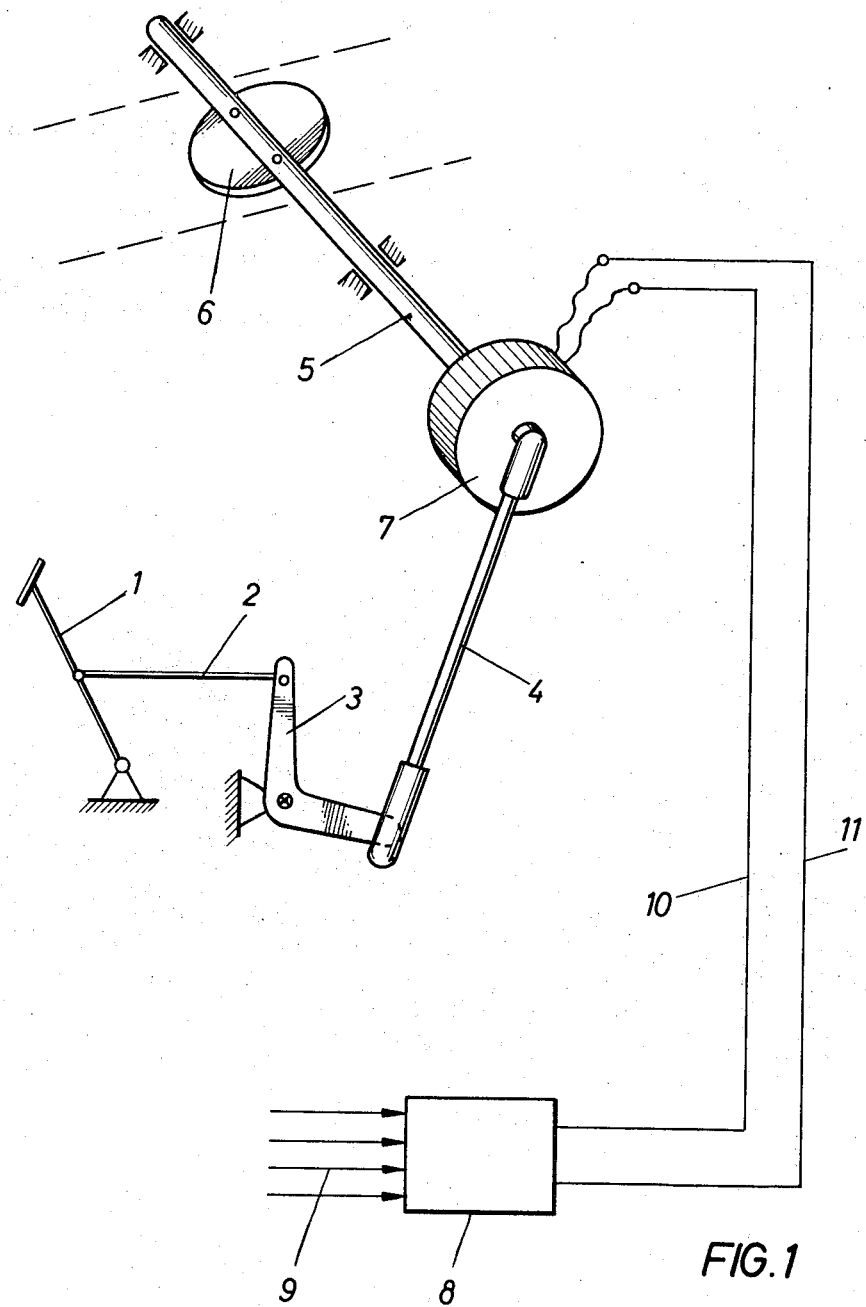
FIG. 1 is a diagrammatic perspective view of one embodiment of the invention.

Basically, the invention provides an arrangement for the automatic control of the torque of an engine of a vehicle when an undesirable slip occurs in the driven wheels of the vehicle due to excessive braking torque of the engine, comprising a device for detecting a wheel slip in at least one of the driven wheels resulting from said excessive braking torque, and an adjusting element controlled by the detecting device to increase the fuel supply to the engine on the occurrence of said slip.

It is known that the braking torque of the engine leads with low power coupling coefficients at the wheels to large wheel slip (insufficient wheel speed) of the driven wheels. Hence, with a suitable road surface and sudden withdrawal of the fuel supply, the vehicle may become unstable on bends, i.e., it may skid. This effect occurs especially with strong engines. The invention seeks to reduce or avoid these drawbacks.

The term "fuel" includes here also electric current, because these braking properties can also occur with electrically powered vehicles. In a mechanically propelled vehicle, the fuel supply is best controlled by the adjusting element acting on the throttle. If the fuel supply is controlled by the drive via an accelerator linkage which may, for example, adjust a throttle valve in accordance with the position of the accelerator pedal, in a preferred embodiment of the invention, the adjusting element is located between the accelerator linkage and the actual adjusting member for the fuel supply, in such a manner the adjusting member is moved relative to the linkage, i.e., without acting on the linkage or causing movement of the accelerator pedal. For example, the adjusting element may cause the throttle valve spindle to rotate and may be mounted on the linkage. Preferably, the adjusting element is a motor, and more particularly a d.c. motor.

The adjusting element may be used both for increasing the fuel supply and for decreasing it. Thus, starting with its normal position, it may be moved in two different directions by means of two different control signals. This makes it possible to avoid both inadmissible wheel slip of a wheel with insufficient speed owing to the engine braking torque, and inadmissible wheel spin owing to excessive engine torque. These two conditions are detected by separate means, and the actual sensors on the wheels are used for producing both control signals. If the vehicle is equipped with an anit-slip control system, parts, and more particularly the sensors of this system, and possibly some of the associated electronics may be used. In the presence of a brake control it may happen that the control leaves the optimum control range, in spite of the operating control, via the motor braking. This prevents the additional braking torque control of the engine according to the invention.

In both cases, the signal for the adjusting element may be produced by comparing the speed of the driven wheels with those of the freely running wheels, as known in the art. In one case, the fuel supply is restricted if the speed of the driven wheels exceeds the speed of the freely running wheels by a certain value or percentage, in the other case, the fuel supply is increased if the speed of the driven wheels are below the speed of the freely running wheels by a certain amount or percentage.

It is also possible to use the mean values of the speeds of the wheels on one axle, or to select, as the driven wheel for the comparison, the driven wheel which has the highest (wheel spin) or the lowest (wheel slip) speed. Furthermore, for preventing skidding due to engine braking torque, it is possible to store a voltage representing the wheel speed of the driven wheel or wheels, and to discharge the store with a predetermined discharge time constant. The store follows an increase in the speed practically without inertia, and its voltage curve represents, with a suitably selected discharge time constant, an approximation of the vehicle speed. A voltage corresponding to the instantaneous wheel speed, may be compared with the voltage of the store, and the comparison mah be used for producing the signal for the adjusting element.

The adjusting element may restrict or increase the supply of fuel by a certain amount in the presence of a spin or wheel slip. An electromagnet might suitably be used as the adjusting element. However, it is also possible to produce a throttling or increase of the fuel supply an an analog to the skid detected. With this analog control, in which the adjusting signal depends in size on the detected skid, a motor is preferably used which operates during rotation against a spring, which spring resets the adjusting element into its starting position on de-energisation of the motor.

A hydraulic drive can also be used as an adjusting member, which drive comprises a pressure source, a control valve, and a cylinder-and-piston arrangement, the movement of the piston effecting for example, a rotation of the throttle valve and the piston being displaced by the valve control Referring now to the drawings, in FIG. 1, the accelerator pedal of the vehicle is shown at 1. Movement of the pedal causes a rotation of the throttle valve 6 through the rod 2, the lever 3, and the rod 4, acting eccentrically on the shaft 5 of the throttle valve 6. Thus an increase or a reduction of the fuel supply is achieved according to the direction of movement of the pedal. The shaft 5 of the throttle valve carries an adjusting element 7 to which the rod 4 is eccentrically pivoted. It will here be assumed that, starting from its normal or inoperative position, the adjusting element is to cause a rotation in either sense (increase and decrease of the supply) without giving rise to a movement of the linkage 2 to 4 or of the accelerator pedal 1. The adjusting element may, for example, be a motor rotatable in both senses, or a double magent. The signals which give rise to this adjustment are derived from an electronic control unit 8 which receives, from sensors 9, voltages corresponding to the rotational wheel speeds of the four wheels. By linking these voltages, the unit 8 can detect an undesirable slip or wheel spin, whereupon the adjusting element 7 is actuated through leads 10 or 11, to cause rotation of the throttle valve 6 in one or the other direction, according to whether a slip or wheel spin has been detected.

Figure 2:
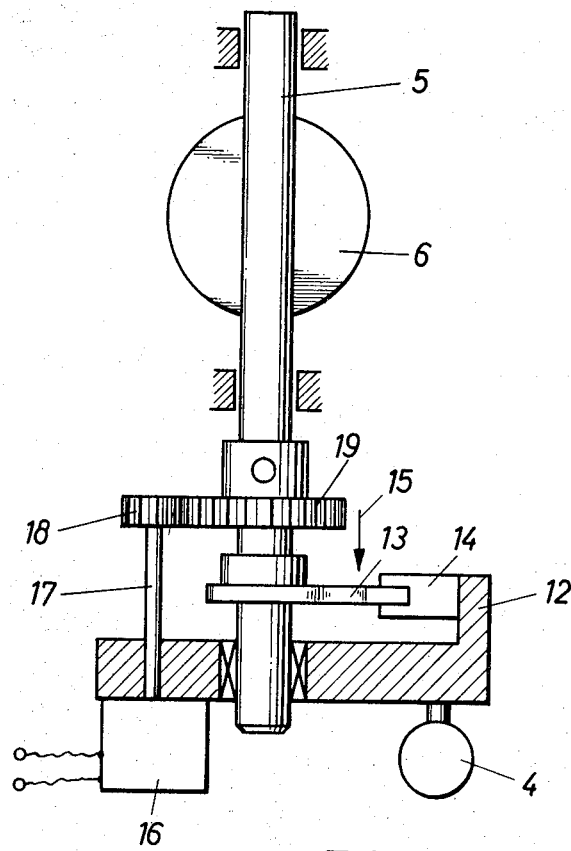
FIG. 2 is a cross-sectional view of a practical embodiment of the invention.
Figure 3:
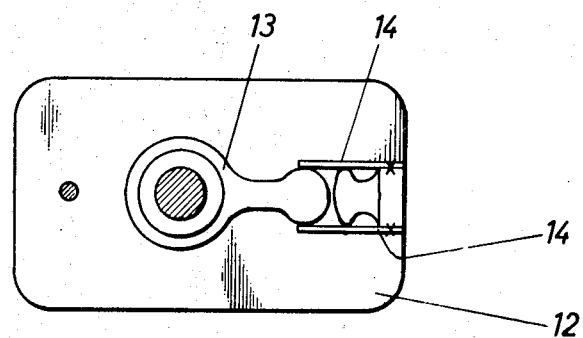
FIG. 3 is a plan view of part of the embodiment shown in FIG. 2.

FIG. 2 is a more detailed view of the arrangement. Here again, the throttle valve is shown at 6 and its shaft at 5. This Figure also shows that the rod 4 acts eccentrically, causing rotation of the throttle valve on longitudinal movement of the rod 4. The shaft 5 is mounted for rotation in a connecting member 12. A stop lever 13 mounted on the shaft 5 is held between two springs or keys 14 and this keeps the shaft 5 and the connecting member 12 in predetermined alignment, under normal conditions. This is shown in the plan view of FIG. 3, taken in the direction of arrow 15 in FIG. 2. The rotation of the shaft in the presence of a slip or wheel spin is caused by means of a motor 16 fitted to the connecting member 12 and rotating the shaft 5 in one or other sense, in accordance with its control, by means of a pinion 18 mounted on the motor shaft 17 and a gear 19 mounted on the shaft 5. The motor 16 operates against one of the springs 14 which return the shaft into its starting position relative to the connecting member 12 when the adjusting signal disappears after the cessation of the skid or wheel spin.

Figure 4:
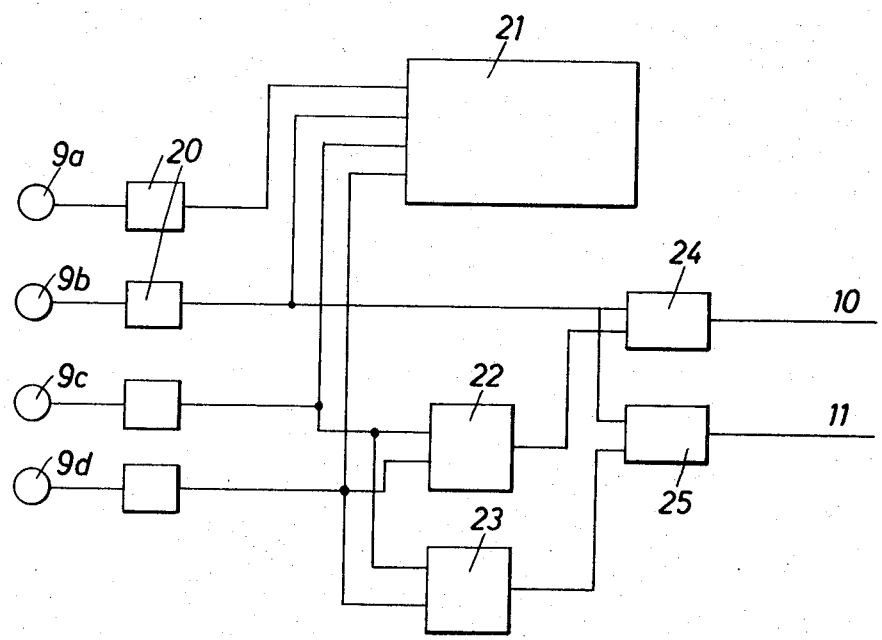
FIG. 4 shows one practical form of the electronics of FIG. 1.

FIG. 4 shows schematically a possible construction for the electronics 8 of FIG. 1. Here the sensors of the two non-driven wheels are given the reference numberals 9a and 9b and the two sensors of the drive wheels are given the reference numberals 9c and 9d. These sensors 9 are connected to frequency voltage transducers 20 which transduce the pulse sequences coming from the sensors 9, the pulse sequence frequencies of which are proportional to the wheel rotational speeds, in each case into a direct voltage corresponding to the rotational speed of the wheel.

The voltages are fed to an anti-locking controller, known per se, which is shown only as a block 21.

In addition, further control signals are also produced from these voltages for example, for the motor 16 of FIG. 2. For this purpose the smaller of the two voltages coming from the driven wheels is selected in a member 22. This voltage, corresponding to the rotational speed of the smaller wheel, is compared in a comparator member 24 with the voltage derived from a non-driven wheel. A control signal for the motor 16 results, if the smaller rotational speed of the driven wheels is smaller by a predetermined amount then the rotational speed of the non-driven wheel. With this situation, the fuel feed is increased.

In addition, moreover, the larger of the two voltages derived from the driven wheels is selected in a member 23. This larger voltage is likewise compared with the voltage derived from a non-driven wheel in a comparator member 25, wherein an actuating signal is produced, if the rotiational speed of a driven wheel lies by a certain amount above the rotational speed of the non-driven wheel. Here the fuel feed is throttled back.

Figure 5:
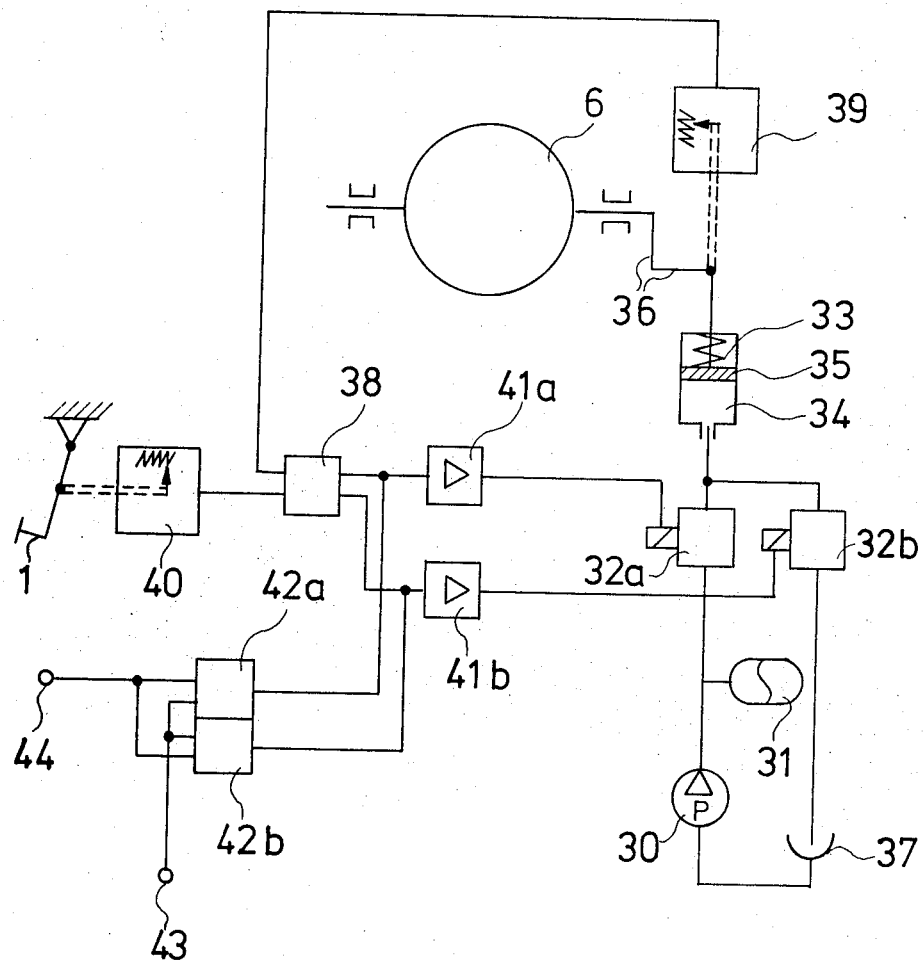
FIG. 5 shows another embodiment of the invention.

In the case of the embodiment of FIG. 5, the throttle valve is again shown and is given the reference number 6. It is adjusted here, not through a set of rods from the accelerator pedal 1, but by means of a hydraulic motor. This hydraulic motor consists of a pump 30, a pressure store 31 connected downstream of the motor, an electromagnetically operated valve arrangement 32a/32b and a piston 35, biassed by means of a spring 33 and located in a cylinder 34. The piston 35 is connected, through a set of rods 36, to the throttle valve 6. Displacements of the piston result in rotational movements of the throttle valve.

The valve arrangement consists of an inlet valve 32a, closed in the non-energized state, and an outlet valve 32b closed in the non-energized state. The position of the piston 35 remains the same when no triggering signals are present. If the inlet valve 32a is opened, the piston 35 will be displaced upwards as a result of the inflowing pressure medium, and in so doing, increases the fuel feed. If the outlet valve 32b is energised, pressure medium can flow out of the cylinder 34 into the pressure store 37; the spring 33 will thus be able to displace the piston 35 downwards, and the fuel feed is reduced.

The triggering signals for the valves are obtained in normal circumstances from a comparator 38 to which is fed a voltage, which corresponds to a position of the throttle valve 6. This throttle voltage is produced in member 39 (e.g., a potentiometer). A voltage, which corresponds to the position of the accelerator pedal 1 and produced in a member 40 is also fed to the comparator 38. If the voltage delivered by the member 40 is greater than that delivered by the member 39, an output signal is produced by the comparator 38 which signal energises the input valve 32a through an amplifier 41a and adjusts the piston 35 and thus the throttle valve 6 in a sense to increase the fuel feed. This adjustment of the throttle valve is followed by the member 39. If, on the other hand, the voltage delivered by the member 39 is greater than that delivered by the member 40, the outlet valve is energised through an amplifier 41b and this triggers an opposite movement of the piston 35 and the valve 6 until the two voltages again substantially correspond and thus both valves become de-energized.

Also an automatic control can be provided in this system. This is indicated by a comparator 42a and 42b, to which is fed, on the one hand a voltage corresponding to the rotational speed of the drive shaft, through a terminal 43 and a reference voltage derived from the non-driven wheels, through the terminal 44. The comparator 42a produces a signal which opens the valve 32a and increases the fuel feed, if an inadmissible slip occurs (driven wheels are too slow). The other comparator 42b emits a signal if the driven wheels rotate too fast (spin) and lowers the fuel feed by opening the valve 32b.

It will be understood that the above description of the present invention is susceptible to various modification changes and adaptations.

What is claimed is:

1. An arrangement for the automatic control of the torque of an engine of a vehicle having a plurality of driven wheels when an undesirable slip occurs in said driven wheels due to exccessive braking torque of the engine, comprising a device for detecting a wheel slip in at least one said driven wheels resulting from said excessive braking torque, and an adjusting element controlled by said detecting device to increase the fuel supply to the engine on the occurrence of said slip so as to prevent slipping of said driven wheels.

2. An arrangement as defined in claim 1, wherein said vehicle includes an i.c. engine controlled by a throttle valve and means are provided, controlled by said adjusting element for controlling said throttle valve.

3. An arrangement as defined in claim 1, wherein means are provided for mounting said adjusting element between means for controlling the fuel supply and an accelerator linkage to cause adjustment of said means relative to said accelerator linkage.

4. An arrangement as defined in claim 3, wherein said adjusting element comprises an electric motor.

5. An arrangement as defined in claim 3, wherein said adjusting element comprises an electromagnet.

6. An arrangement as defined in claim 3, wherein said adjusting element comprises a hydraulic drive including a pressure source, a cylinder and piston arrangement, the position of whose piston controls said means for controlling fuel supply and a control valve arrangement for triggering said hydraulic drive.

7. An arrangement as defined in claim 6, and comprising a control circuit including said hydraulic drive for controlling said means and an accelerator pedal for controlling said control circuit.

8. An arrangement as defined in claim 1, wherein said adjusting element comprises an element movable from its starting or non-operative position, in both senses so as to open or close means for controlling fuel supply and additional known means are provided for detecting a wheel spin of the driven wheels and for producing a control signal which is supplied to said adjusting element so as to cause it to move in the sense to close said means.

9. An arrangement as defined in claim 8, wherein said means for detecting wheel spin and/or wheel skid comprises sensors of an anti-skid brake control system of said vehicle.

10. An arrangement as defined in claim 9, wherein said means for detecting wheel skid and/or wheel spin also comprises part of the electronics of said anti-skid brake control system.

* * * * *